US009019121B1

(12) United States Patent
Duff et al.

(10) Patent No.: US 9,019,121 B1
(45) Date of Patent: Apr. 28, 2015

(54) CONFIGURATION OVER POWER DISTRIBUTION LINES

(75) Inventors: John F. Duff, Breezy Point, MN (US); Scott H. Christiansen, Brainerd, MN (US); Rolf Flen, Pequot Lakes, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 668 days.

(21) Appl. No.: 13/335,470

(22) Filed: Dec. 22, 2011

(51) Int. Cl.
G08C 15/06 (2006.01)
G01D 4/00 (2006.01)
H04B 3/54 (2006.01)

(52) U.S. Cl.
CPC ............... *G01D 4/002* (2013.01); *G01D 4/004* (2013.01); *H04B 3/542* (2013.01); *H04B 2203/5433* (2013.01)

(58) Field of Classification Search
USPC ....................................................... 340/13.23
See application file for complete search history.

(56) References Cited

U.S. PATENT DOCUMENTS

| 5,581,229 | A | 12/1996 | Hunt |
| 6,154,488 | A | 11/2000 | Hunt |
| 6,177,884 | B1 | 1/2001 | Hunt et al. |
| 6,998,963 | B2 * | 2/2006 | Flen et al. ..................... 375/260 |
| 7,102,490 | B2 | 9/2006 | Flen et al. |
| 7,145,438 | B2 | 12/2006 | Flen et al. |
| 7,180,412 | B2 | 2/2007 | Bonicatto et al. |
| 7,184,861 | B2 | 2/2007 | Petite |
| 7,209,840 | B2 | 4/2007 | Petite et al. |
| 7,224,740 | B2 | 5/2007 | Hunt |
| 7,236,765 | B2 | 6/2007 | Bonicatto et al. |
| 7,346,463 | B2 | 3/2008 | Petite et al. |
| 7,432,824 | B2 | 10/2008 | Flen et al. |
| 7,443,313 | B2 | 10/2008 | Davis et al. |
| 7,468,661 | B2 | 12/2008 | Petite et al. |
| 7,706,320 | B2 | 4/2010 | Davis et al. |
| 7,738,999 | B2 | 6/2010 | Petite |
| 7,742,393 | B2 | 6/2010 | Bonicatto et al. |
| 7,774,530 | B2 | 8/2010 | Haug et al. |
| 7,791,468 | B2 | 9/2010 | Bonicatto et al. |
| 7,877,218 | B2 | 1/2011 | Bonicatto et al. |
| 7,978,059 | B2 | 7/2011 | Petite et al. |
| 8,144,816 | B2 | 3/2012 | Bonicatto et al. |
| 8,144,820 | B2 | 3/2012 | Bonicatto |
| 8,194,789 | B2 | 6/2012 | Wolter et al. |
| 8,238,263 | B2 | 8/2012 | Kohout et al. |
| 2008/0304595 | A1 | 12/2008 | Haug et al. |
| 2011/0121952 | A1 | 5/2011 | Bonicatto et al. |
| 2011/0176598 | A1 | 7/2011 | Kohout et al. |
| 2011/0218686 | A1 | 9/2011 | McHann, Jr. et al. |
| 2011/0249678 | A1 | 10/2011 | Bonicatto et al. |

(Continued)

*Primary Examiner* — Brian Zimmerman
*Assistant Examiner* — Sara Samson
(74) *Attorney, Agent, or Firm* — Crawford Maunu PLLC

(57) ABSTRACT

Aspects of the present disclosure are directed toward the use of broadcast transmissions to multiple endpoint devices. These broadcast transmissions can be particularly useful for reducing the communication bandwidth used during transmission of configuration data to the endpoint devices. In order to implement the broadcast communications, the present disclosure describes a mechanism for configuring targeted endpoint devices to be responsive to the broadcast communications. For instance, a configuration command can be sent to each of the targeted endpoint devices. The configuration command can include a virtual ID. The targeted endpoint devices can configure themselves to listen for subsequent broadcast messages addressed to the virtual ID. Configuration data can then be sent using the virtual ID and associated broadcast messages.

18 Claims, 6 Drawing Sheets

(56) References Cited

U.S. PATENT DOCUMENTS

| | | |
|---|---|---|
| 2012/0057592 A1 | 3/2012 | Zeppetelle et al. |
| 2012/0076212 A1 | 3/2012 | Zeppetelle et al. |
| 2012/0084559 A1 | 4/2012 | Bonicatto |
| 2012/0106664 A1 | 5/2012 | Bonicatto et al. |

* cited by examiner

CONFIGURATION OVER POWER DISTRIBUTION LINES

BACKGROUND

Service providers utilize distributed networks to provide services to customers over large geographic areas. For example, power companies use power distribution lines to carry power from one or more generating stations (power plants) to residential and commercial customer sites alike. The generating stations use alternating current (AC) to transmit power over long distances via the power distribution lines. Long-distance transmission can be accomplished using a relatively high voltage. Substations located near the customer sites provide a step-down from the high voltage to a lower voltage (e.g., using transformers). Power distribution lines carry this lower-voltage AC from the substations to the endpoint devices customer sites.

Communications providers may utilize a distributed communications network to provide communications services to customers. Similarly, power companies utilize a network of power lines, meters, and other network elements to provide power to customers throughout several geographic regions and to receive data about the power usage. However, data communication in a system that contains many thousands of endpoint devices over power distribution lines can be a particularly challenging issue. The sheer number of endpoint devices contributes to a host of issues including synchronization, communication bandwidth and cost concerns.

For instance, the noise on power distribution lines can create problems with transmission between the many different devices. These problems can include the signal strength relative to noise. Various coding, processing and other techniques can be used to help compensate for poor signal integrity; however, many of these techniques come at the cost of reduced bandwidth. These and other concerns represent difficulties that arise in the context of setup and maintenance of such a large number of endpoint devices, particularly when it is desirable to have flexibility in how the endpoint devices are configured and operated.

SUMMARY

The present disclosure is directed to systems and methods for use with configuration of endpoint devices connected over power distribution lines. These and other aspects of the present disclosure are exemplified in a number of illustrated implementations and applications, some of which are shown in the figures and characterized in the claims section that follows.

Particular embodiments of the present disclosure relate to the use of broadcast transmissions to multiple endpoint devices. These broadcast transmissions can be particularly useful for reducing the communication bandwidth used during transmission of configuration data to the endpoint devices. In order to implement the broadcast communications, the present disclosure describes a mechanism for configuring targeted endpoint devices to be responsive to the broadcast communications. For instance, a configuration request can be sent to each of the targeted endpoint devices. The configuration request can include a virtual ID. The targeted endpoint devices can configure themselves to listen for subsequent broadcast messages addressed to the virtual ID. Configuration commands containing configuration data can then be sent using the virtual ID and associated broadcast messages.

Various embodiments are also directed toward timing considerations relative to when the configuration data is to be used by the endpoint devices. The configuration data can be stored in a temporary memory location after being received at each endpoint device. A configuration request can provide a specified time for the endpoint devices to replace the previous configuration data with the new configuration data. This can be particularly useful for synchronizing the updating of configuration data. For instance, new time-of-use (TOU) maps may be configured to be instituted for all qualifying customers at the same time. Otherwise, the billing based upon the TOU maps would be updated at different times and billing for various customers might be different despite customers having the same plan. This differing time can be aggravated by difficulties with transmission quality on power distribution lines and by the sheer number of endpoint devices.

Example embodiments of the instant disclosure are directed to a method for providing configuration data while conserving bandwidth of communications over power distribution lines (carrying alternating current (AC) power). The conserved bandwidth, in embodiments of this method, is shared between different endpoints devices. The endpoint devices are configured to provide utility usage data over the power distribution lines. The method includes identifying a group of endpoint devices (from the plurality of endpoint devices) that are targeted for changes to stored configuration data. Further, a communication plan is developed by selecting between group identification (IDs) for subsets of the plurality of endpoint devices. The selection is based upon the available bandwidth on the power distribution lines, and is responsive to correspondence to one or more endpoints in the group of endpoint devices. Certain embodiments of this method include developing a communication plan that includes the selection of a transmission rate for the broadcast messages as a function of the shared bandwidth. Moreover, the method includes communication of a configuration request, over the power distribution lines, according to the communication plan. The communication is carried out by broadcasting the request to the selected group identification(s). This use of broadcast communications can be particularly useful for conserving communication bandwidth and for rapid configuration of many different endpoint devices.

Other embodiments of the instant disclosure are directed towards a method for conserving bandwidth for communications over power distribution lines that carry alternating current (AC) power. The method includes identifying a subset of a plurality of endpoint devices as targets for updates to utility meter reporting configuration data. This method further communicates a configuration request over the power distribution lines using endpoint identifiers corresponding to the subset of endpoint devices. The configuration request includes an indication of what configuration commands will be forthcoming and an assignment of a virtual identifier to the subset of endpoint devices. Additionally, a broadcast message is communicated over the power distribution lines. The broadcast message is addressed to the subset of endpoint devices using the virtual transmission identifier, and includes at least some of the forthcoming configuration commands. Each endpoint can then transmit a confirmation after receiving all of the forthcoming configuration commands. The endpoints can then execute the configuration commands (for each endpoint device of the subset of endpoint devices).

The instant disclosure is also directed towards circuit-based apparatuses. Example embodiments of the circuit-based apparatus include a transceiver circuit and a processing circuit. The transceiver circuit, of the circuit-based apparatuses, is designed to communicate over power distribution lines that carry power using alternating current (AC). The processing circuit is configured and arranged for multiple functionalities. For instance, the processing circuit is designed to operate according to configuration data stored in a first memory buffer. Additionally, this processing circuit is configured to receive an input digital signal representing an analog signal received at the aforementioned transceiver circuit. The processing circuit is also configured and arranged to decode the input digital signal, identify a configuration request from the decoded input signal, and store data from the configuration request in a second memory buffer. The processing circuit is additionally designed to verify the data from the configuration request, and after verifying the data, maintain operation according to the configuration data stored in the first memory buffer. In response to a timer event (e.g., the occurrence of a specified time-of-day), the processing circuit is additionally designed to replace the configuration data stored in the first memory buffer with the data from the configuration request in the second memory buffer, and operate according to the data from the configuration request in the first memory buffer.

The instant disclosure is additionally directed towards a method, which includes receiving, using a transceiver circuit, an analog data communication over power distribution lines that carry power using alternating current (AC). In this method, the processing circuit is operated according to configuration data stored in a first memory buffer. For data communications over a power line, the processing circuit is configured to convert the analog data communication to a digital signal. The processing circuit can then be used to decode the digital signal. Using the decoded digital signal, the processing circuit can identify a configuration request. Data from the configuration request is stored by the endpoint in a second memory buffer. The processing circuit can also verify the data from the configuration request. After verifying the data, the processing circuit can maintain operation according to the configuration data stored in the first memory buffer. In response to a timer event, the processing circuit replaces the configuration data stored in the first memory buffer with the data from the configuration request in the second memory buffer. Thereafter, the processing circuit operates according to the data from the configuration request in the first memory buffer.

The above summary is not intended to describe each illustrated embodiment or every implementation of the present disclosure. The figures and detailed description that follow, including that described in the appended claims, more particularly describe some of these embodiments.

BRIEF DESCRIPTION OF FIGURES

Various example embodiments may be more completely understood in consideration of the following detailed description in connection with the accompanying drawings, in which.

Figure 1:
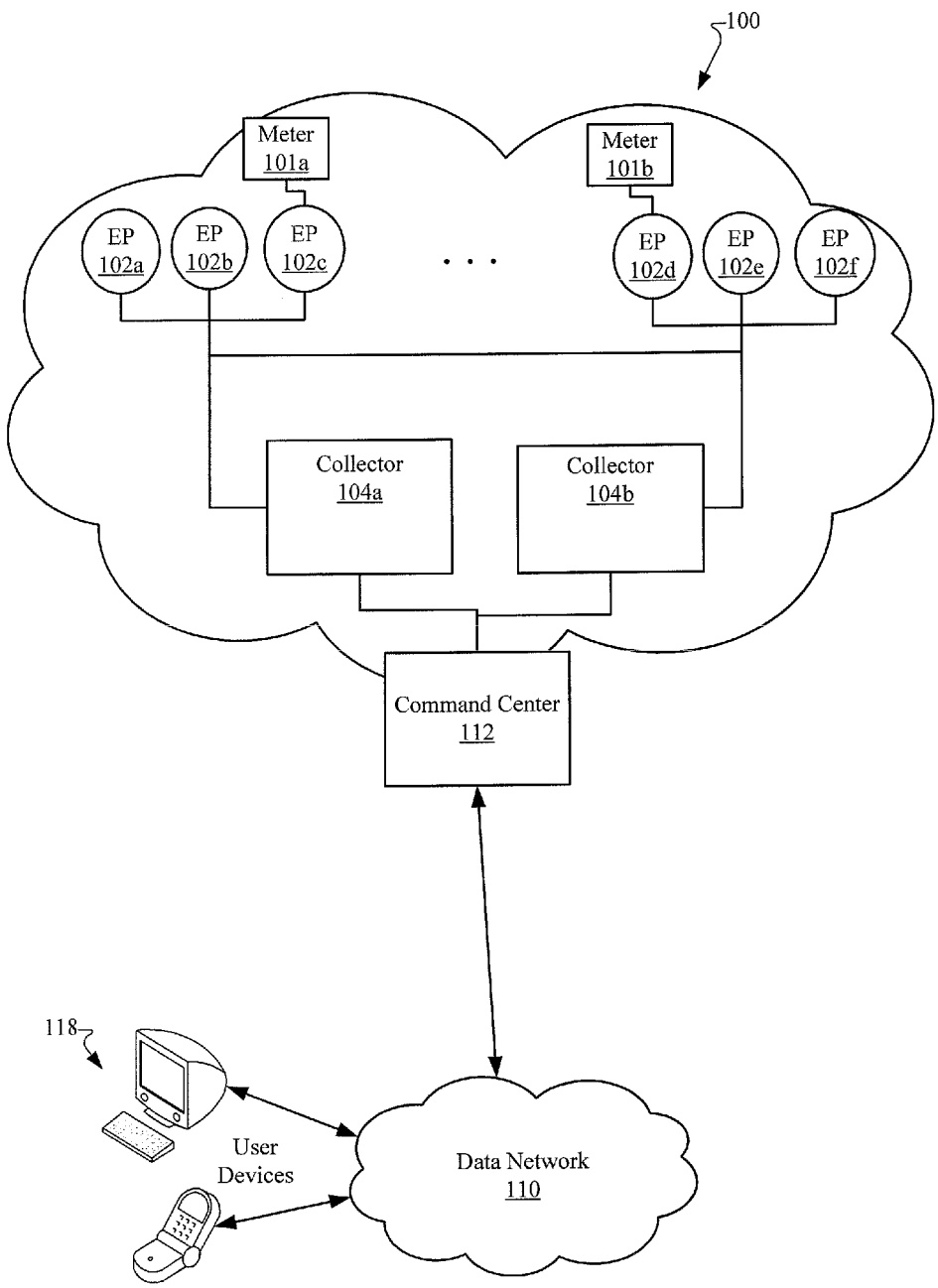
FIG. 1 is a block diagram of an example network environment in which endpoints communicate data with collector units, consistent with embodiments of the present disclosure.

While the disclosure is amenable to various modifications and alternative forms, examples thereof have been shown by way of example in the drawings and will be described in detail. It should be understood, however, that the intention is not to limit the disclosure to the particular embodiments shown and/or described. On the contrary, the intention is to cover all modifications, equivalents, and alternatives falling within the spirit and scope of the disclosure.

DETAILED DESCRIPTION

Aspects of the present disclosure are believed to be applicable to a variety of different types of devices, systems and arrangements, including those that may be implemented for configuration of devices communicating over power distribution lines. While the present disclosure is not necessarily limited to such applications, various aspects of the disclosure may be appreciated through a discussion of various examples using this context.

Complex power line communication systems can be configured with thousands or even millions of endpoint devices deployed across a large geographical area spanning hundreds or even thousands of miles. Collector devices can be deployed across the geographical area to provide an interface between sets of the endpoint devices. For instance, the collector devices can be deployed at power distribution substations and from this location the collectors can interface with thousands of individual endpoint devices using communications that are transmitted over power distribution lines. Consistent with various embodiments of the present disclosure, bandwidth constraints of such systems can be lessened by providing updated configuration data to endpoints using a specially-designed communication plan. The configuration data sent to the endpoints can include, but is not limited to, parameters such as timing breakdowns for utility billing purposes, time zone settings, communication protocol/packing lists and other configuration information.

Particular embodiments of the present disclosure relate to the use of broadcast transmissions to multiple endpoint devices. These broadcast transmissions can be particularly useful for reducing the communication bandwidth used during transmission of configuration data to the endpoint devices. In order to implement the broadcast communications, the present disclosure describes a mechanism for configuring targeted endpoint devices to be responsive to the broadcast communications. For instance, a configuration request can be sent to each of the targeted endpoint devices. The configuration request can include a virtual ID. The targeted endpoint devices can configure themselves to listen for subsequent broadcast messages addressed to the virtual ID. Configuration data can then be sent using the virtual ID and associated broadcast messages.

Consistent with certain embodiments, once configuration is complete, the targeted endpoint devices can automatically erase the assigned virtual ID or otherwise cease to respond to the virtual ID. This automated process can be particularly useful for avoiding any need for the command center to send a command to delete the virtual ID.

Various embodiments are also directed toward timing considerations relative to when the configuration data is to be used by the endpoint devices. The configuration data can be stored in a temporary memory location after being received at each endpoint device. A configuration request can provide a specified time for the endpoint devices to replace the previous configuration data with the new configuration data. This can be particularly useful for synchronizing the updating of configuration data. For instance, new time-of-use (TOU) maps may be configured to be instituted for all qualifying customers at the same time. Otherwise, the billing based upon the TOU maps would be updated at different times and billing for various customers might be different despite customers having the same plan. This differing time can be aggravated by difficulties with transmission quality on power distribution lines and by the sheer number of endpoint devices.

Example embodiments of the instant disclosure are directed to a method for providing configuration data while conserving bandwidth of communications over power distribution lines (carrying alternating current (AC) power). The conserved bandwidth, in embodiments of this method, is shared between different endpoint devices. The endpoint devices are configured to provide utility usage data over the power distribution lines. The method includes identifying a group of endpoint devices (from the plurality of endpoint devices) that are targeted for changes to stored configuration data. Further, a communication plan is developed by selecting between group identification (IDs) for subsets of the plurality of endpoint devices. The selection is based upon the available bandwidth on the power distribution lines, and is responsive to correspondence to one or more endpoints in the group of endpoint devices. Certain embodiments of this method include developing a communication plan that includes the selection of a transmission rate for the broadcast messages as a function of the shared bandwidth. Moreover, the method includes communication of a configuration request, over the power distribution lines, according to the communication plan. The communication is carried out by broadcasting the request to the selected group identification(s). This use of broadcast communications can be particularly useful for conserving communication bandwidth and for rapid configuration of many different endpoint devices.

In certain specific embodiments, communication of the configuration request includes assigning the group of endpoint devices to a virtual ID and wherein the step of communicating configuration requests includes configuring the broadcast messages to use the virtual ID. This method for providing configuration data can also involve the communication of configuration commands to the group of endpoint devices using broadcast messages that reduce the data bandwidth over power distribution lines. Utility usage data is also communicated from the endpoint devices and over power distribution lines. The utility usage data is interspersed with confirmation data, which indicates that the configuration commands were received by the group of endpoint devices. In response to the confirmation or lack thereof, the communication plan is adjusted. Certain specific embodiments of adjusting the communication plan include grouping endpoints based upon their progress relative to their receipt and storage of the configuration commands.

In certain specific embodiments, in developing a communication plan, a tiered grouping of the group endpoint devices is developed according to stored communication metrics that represent data transmission fidelity of the group of endpoint devices. In other embodiments, the configuration request includes data that indicates what types of configuration commands will be sent. In embodiments where the configuration request indicates the type of communication commands sent, the communication of confirmation data is responsive to a comparison between the indicated types of configuration commands and those configuration commands actually received.

Other embodiments of the instant disclosure are directed towards a method for conserving bandwidth for communications over power distribution lines that carry alternating current (AC) power. The method includes identifying a subset of a plurality of endpoint devices as targets for updates to utility meter reporting configuration data. A configuration request is communicated over the power distribution lines, where the configuration request uses endpoint identifiers corresponding to the subset of endpoint devices. The configuration request can also include an indication for what configuration commands will be forthcoming and an assignment of a virtual identifier to the subset of endpoint devices. A broadcast message is then communicated over the power distribution lines by addressing the subset of endpoint devices using the virtual transmission identifier. The broadcast message includes at least some of the forthcoming configuration commands. Each endpoint device can be configured to transmit a confirmation of the receipt for all of the forthcoming configuration commands. The endpoint devices can then execute the configuration commands.

In certain specific embodiments of methods for conserving bandwidth for communications over power distribution lines the configuration request can include a configuration time. Each endpoint device, of the subset of endpoint devices, can then execute the configuration commands at the configuration time. Other embodiments include a step of sending a plurality of configuration request messages, each message containing an endpoint identifier that uniquely identifies one endpoint device relative to the plurality of endpoint devices. The configuration request can be carried out by sending a single broadcast message that contains a group identifier that identifies the plurality of endpoint devices.

The instant disclosure is also directed towards circuit-based apparatuses. Example embodiments of the circuit-based apparatus include a transceiver circuit and a processing circuit. The transceiver circuit is designed to communicate over power distribution lines that carry power using alternating current (AC). The processing circuit is configured and arranged to provide multiple functions. For instance, the processing circuit is designed to operate according to configuration data stored in a first memory buffer. These operations can include, but are not limited to, meter reporting functions, time-based settings and data packing options for controlling communication bandwidth. The processing circuit can be configured to receive an input digital signal representing an analog signal that is received at the aforementioned transceiver circuit. Further, the processing circuit is configured and arranged to decode the input digital signal, identify a configuration request from the decoded input signal, and store data from the configuration request in a second memory buffer. The processing circuit can also verify the data from the configuration request. After the data is verified, the processing circuit can maintain its operation according to the configuration data stored in the first memory buffer. In response to a timer event (e.g., the occurrence of a specified time-of-day), the processing circuit is designed to replace the configuration data stored in the first memory buffer with the data from the configuration request in the second memory buffer. Thereafter, the processing circuit operates according to the data from the configuration request, which is now located in the first memory buffer.

In certain embodiments of the above-described circuit-based apparatus, the processing circuit can compare identification information in the configuration request with a locally-stored identifier, and prevent the storing of the data from the configuration request in the second memory buffer in response to a failed comparison. In additional embodiments, the processing circuit is configured and arranged to detect the absence of a group identifier in the configuration request before preventing the storing of the data. Further, the processing circuit can be designed, in certain specific embodiments, to send a configuration confirmation using the transceiver circuit.

Embodiments of the present disclosure are directed toward modifying one or more endpoints to add themselves to a group ID. An add group command can be used to move an endpoint from one configuration group to an entirely different one. Other aspects relate to a modification of an existing group by changing some aspect(s) of the configuration settings for the existing group that endpoints belong to, but not changing them from one group to another. The instant disclosure is additionally directed towards a method that includes receiving, using a transceiver circuit, an analog data communication over power distribution lines that carry power using alternating current (AC). In this method, the processing circuit is operated according to configuration data stored in a first memory buffer, and converts the analog data communication to a digital signal. The method further includes, using the processing circuit to: decode the digital signal; identify a configuration request from the decoded digital signal; and store data from the configuration request in a second memory buffer. The method additionally utilizes the processing circuit to verify the data from the configuration request, and after verifying the data, maintain operation according to the configuration data stored in the first memory buffer. In response to a timer event, the method uses the processing circuit to replace the configuration data stored in the first memory buffer with the data from the configuration request in the second memory buffer and to operate according to the data from the configuration request in the first memory buffer.

Turning now to the figures, FIG. 1 is a block diagram of an example network environment 100 in which endpoints 102 communicate data with collector units 104, consistent with embodiments of the present disclosure. The network environment 100 includes a service network in which a plurality of endpoints 102a-102f are coupled (e.g., communicatively coupled) to collector units 104a, 104b. Consistent with embodiments of the present disclosure, the endpoints 102 can provide data from utility meters. For instance, data can be provided from power meters, gas meters and water meters, which are respectively installed in gas and water distribution networks. Moreover, while the present disclosure sometimes refers to the endpoints 102 as providing data utility (e.g., power) metering over a power distribution network, other data can also be communicated.

The endpoints 102 can be implemented to monitor and report various operating characteristics of the service network. For example, in a power distribution network, meters can monitor characteristics related to power usage in the network. Example characteristics related to power usage in the network include average or total power consumption, power surges, power drops and load changes, among other characteristics. In gas and water distribution networks, meters can measure similar characteristics that are related to gas and water usage (e.g., total flow and pressure).

Data bandwidth can be conserved by configuring the endpoints to arrange the data communications according to packing lists. These packing lists can define where different types of data are placed within a block of data. The packing list can be particularly useful for allowing data to be transmitted without headers identifying different types of data. The packing list can be stored in a local configuration memory and can be updated in response to configuration commands.

The local configuration memory can also store information indicating a metrology time that is specific to the endpoint device and its geographical location. For instance, the configuration memory can store information about the relevant time zone and daylight's savings time.

Other information stored in the local configuration memory can include information used for billing. For instance, the information can include time-of-use (TOU) maps. A TOU map can represent different time periods that define billing break downs. For instance, the billing break down can have multiple billing rates that can be mapped to several different time periods or schedules. The schedules can be different from season to season and also account for holidays and weekends. For instance, each schedule can include a specified number of rate changes, where the rate changes can have a granularity consistent with the rate of data transmission (e.g., at 15 minute resolution).

Consistent with certain embodiments of the present disclosure, the configuration data, which can include a TOU map, can be received, but not used. Later, at either a scheduled time or in response to a scheduled event, the configuration data can be used (e.g., by replacing the old configuration data). For instance, the endpoints can be directed to update received configuration data at midnight of a specific day. Thereafter, the endpoints can send a confirmation that the configuration update was successfully completed.

In certain implementations, the configuration update procedure for the endpoints can be carried out according to a specific communication plan. This communication plan can be designed to efficiently use communication bandwidth. For instance, the endpoints 102 can be configured to report the operating characteristics of the network over communications channels. Communications channels are portions of spectrum over which data are transmitted. The center frequency and bandwidth of each communications channel can depend on the communications system in which they are implemented. In some implementations, the communications channels for utility meters (e.g., power, gas and/or water meters) can be transmitted using power line communication networks that allocate available bandwidth between endpoints according to an orthogonal frequency division multiple access (OFDMA) spectrum allocation technique or another channel allocation technique. The communication plan can be designed in response to the operating characteristics of the network. This can include, for instance, grouping endpoints according to the expected error rates. Endpoints with higher expected error rates can be grouped together. This can allow for the communication plan to be configured for more repeated broadcast transmissions to these endpoints.

When the endpoints 102 are implemented in connection with power meters in a power distribution network, the endpoints 102 and/or the power meters transmit reporting data that specify updated meter information that can include measures of total power consumption, power consumption over a specified period of time, peak power consumption, instantaneous voltage, peak voltage, minimum voltage and other measures related to power consumption and power management (e.g., load information). Each of the power meters can also transmit other data, such as status data (e.g., operating in a normal operating mode, emergency power mode, or another state such as a recovery state following a power outage). Embodiments of the present disclosure are directed toward developing and implementing a communication plan that is designed to allow the reporting functions to continue without interruption.

In FIG. 1, endpoints 102a-102c and 102d-102f transmit data over communication channels to collector units 104a, 104b, respectively. The collector units 104 can include circuitry (e.g., including one or more data processors) that is configured and arranged to communicate with the endpoints over power distribution lines. The collector units 104 can also include circuitry for interfacing with a command center 112. The interface to the command center 112 can be implemented using a variety of different communication networks including, but not limited to, a wide-area network (WAN) using Ethernet.

According to certain embodiments of the present disclosure, the collectors are installed in substations and are used to control bidirectional communication with both the command center 112 (e.g., located at a utility office) and endpoints (e.g., located at metering locations for various customer sites). This messaging to the endpoints can be sent to an individual endpoint, or broadcast simultaneously to groups of endpoints or even sent to all endpoints connected to the collectors 104. Consistent with certain embodiments, the collectors 104 are built according to an industrial-grade computer specification in order to withstand the harsh environment of a substation.

In certain embodiments of the present disclosure, the collector(s) 104 can receive data from many different endpoints 102 while storing the data in a local database. A collector can also take action based on the data received from the endpoints and transmit data received from the endpoints to a command center 112. For example, in a power line communication (PLC) network, the command center 112 can receive data indicating that power usage is significantly higher in a particular portion of a power network than in other portions of the power network. Based on this data, the command center 112 can allocate additional resources to that particular portion of the network (i.e., load balance) or provide data specifying that there is increased power usage in the particular portion of the power network.

Consistent with certain embodiments, the command center 112 provides an interface that allows user devices 118 access to data received from endpoints 102. For example, the user devices might be owned by utility provider operator, maintenance personnel and/or customers of the utility provider. For example, data identifying the increased power usage described above can be provided to a user device 118 accessible by the network operator, who can, in turn, determine an appropriate action regarding the increased usage. Additionally, data identifying a time-of-use (TOU) measure and/or a peak demand measure can also be provided to user devices 118. Similarly, if there has been a power outage, the command center 112 can provide data to user devices 118 that are accessible by customers to provide information regarding the existence of the outage and potentially provide information estimating the duration of the outage. Many of these functions can be facilitated by configuring the endpoint devices as this can result in increased scalability. For instance, by configuring the endpoint devices with TOU maps, some of the TOU calculations can be offloaded from a central processor to the many different endpoint devices. This can be particularly useful where there are hundreds of thousands of endpoint devices.

The data network 110 can be a wide area network (WAN), local area network (LAN), the Internet, or any other communications network. The data network 110 can be implemented as a wired or wireless network. Wired networks can include any media-constrained networks including, but not limited to, networks implemented using metallic wire conductors, fiber optic materials, or waveguides. Wireless networks include all free-space propagation networks including, but not limited to, networks implemented using radio wave and free-space optical networks.

Symbols from a particular endpoint may be transmitted using any of thousands of valid communications channels in a PLC system. For example, each endpoint can be assigned a particular channel using OFDMA or another channel allocation technique. Channel assignments for the endpoints 102a-102c, 102d-102f that communicate with particular collectors 104a, 104b can be stored, for example, in a communications data store that is accessible to the command center 112 and/or the collectors 104a, 104b.

Consistent with embodiments of the present disclosure, each collector 104 can be configured to be in communication with thousands of endpoints 102 and there can be hundreds or even thousands of collectors 104 in connection with the command center 112. Thus, there can be many total endpoints and many thousands sharing communications on a common power distribution line. Accordingly, embodiments of the present disclosure are directed toward efficient use of communication bandwidth in configuration-based actions.

Consistent with embodiments of the present disclosure, a method involves providing configuration data while conserving bandwidth of communications over power distribution lines carrying alternating current (AC) power. In this method, the bandwidth is shared between a plurality of endpoint devices 102a-102f that are configured to provide utility usage data (e.g., from utility meters 101a-101b) over the power distribution lines. The method involves identifying particular endpoint devices that are targeted for changes to stored configuration data. The method further includes developing a communication plan (e.g., by the command center 112) by selecting between a group of identifications (IDs) for subsets of targeted endpoint devices. This selection is responsive to correspondence to one or more endpoints in the targeted endpoint devices and is useful for reducing the used bandwidth on the power distribution lines.

For instance, endpoint devices can contain group IDs based upon similar TOU schedules, common ownership by a utility company, geographic location and/or other bases. In some instances, the targeted endpoint devices, targeted for (re)configuration may include all endpoint devices within one or more of these group IDs. The communication plan can therefore include the use of a configuration command that uses these group IDs to assign a virtual ID to all endpoints having the group IDs. In certain instances, one or more of the endpoints within the group IDs might not be targeted. The communication plan could, in one instance, still configure all endpoints within the group to use the virtual ID. Individualized communications, however, could be used to remove the untargeted endpoints devices from the virtual ID group. The decision on whether to use such a strategy can be based upon the number of communications and associated bandwidth expected to be required. For instance, if a group of 100,000 endpoints having a common group ID includes 90,000 targeted endpoints and 10,000 untargeted endpoints, the command center 112 might determine that less bandwidth is required to send a broadcast configuration message to the group ID and 10,000 individual messages to the untargeted endpoints (e.g., as opposed to sending 90,000 individual messages to the targeted endpoints). The potential permutations can become increasingly complex where, for instance, endpoints are part of more than one group ID.

Additionally, the method can include communicating, over the power distribution lines, a configuration request according to the communication plan, and by broadcasting the request to the select group of ID(s). In this method, the communications over the power distribution lines are facilitated by collectors 104a-104b. The method will also communicate configuration commands (over power distribution lines) to the group of endpoint devices using broadcast messages, which reduce the data bandwidth over power distribution lines. Moreover, the method includes communicating utility usage data (e.g., from the utility meters 101a-101b) over the power distribution lines. The utility usage data is interspersed with confirmation data indicating that the configuration commands were received by the targeted group of endpoint devices. In response to the confirmation, the method will adjust the communication plan. For instance, if all endpoints have acknowledged receipt of a current configuration command, the next step of the communication plan can be implemented. If, however, less than all the endpoints have acknowledged receipt, the communication plan can be modified to account for one or more of the non-responsive endpoints (e.g., by removing the non-responsive endpoints from a group targeted for subsequent configuration commands, by resending the current configuration command until complete or by modifying the number of retries for a collector).

Some embodiments of the present disclosure relate to modifying a communication plan as a function of the number of remaining endpoints for a particular collector. For example, all endpoints linked to a first collector might have finished with a current reconfiguration operation. Endpoints linked to a second collector may not have finished the current reconfiguration operation. Commands sent to the first collector can be stopped, while commands sent to the second collector can continue.

In certain embodiments, communication of a configuration request will include assigning the targeted group of endpoint devices to a virtual ID. Moreover, in those embodiments, communicating configuration commands includes configuring the broadcast messages to use the virtual ID. Moreover, in other specific embodiments, developing a communication plan will include selecting a transmission rate for the broadcast messages as a function of the shared bandwidth.

Consistent with particular embodiments of the present disclosure, a tiered grouping of the targeted group of endpoint devices can be developed according to stored communication metrics representing data transmission fidelity of the targeted group of endpoint devices. This grouping can be implemented as part of developing a communication plan. The configuration request, in certain embodiments of the method described with reference to FIG. 1, indicates what types of configuration commands will be sent, and further, communication confirmation data is responsive to a comparison between the indicated types of configuration commands and those configuration commands actually received. In response to the confirmation, this method can include, in specific embodiments, grouping endpoints 102a-102f based upon their progress toward receiving the configuration commands in the step of adjusting the communication command.

Figure 2:
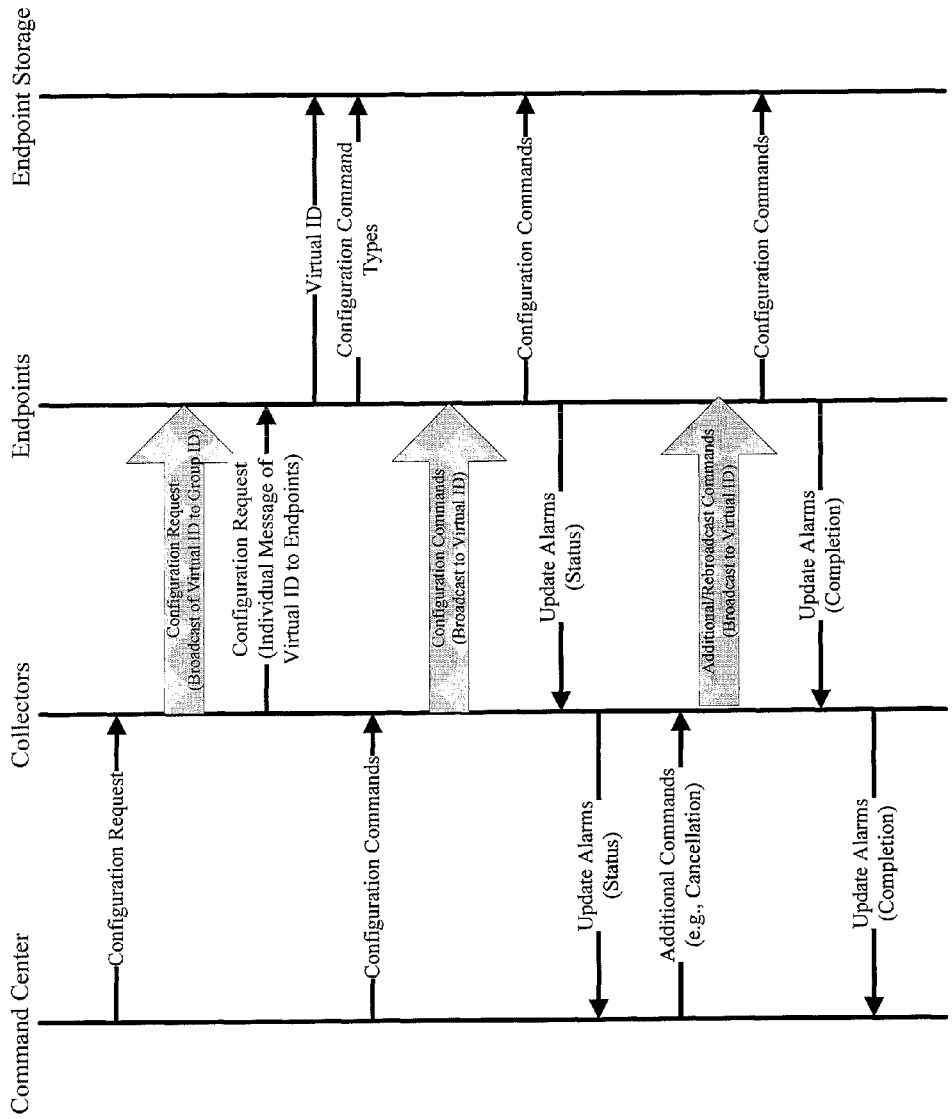
FIG. 2 depicts a message flow diagram, consistent with embodiments of the present disclosure.

FIG. 2 depicts a message flow diagram, consistent with embodiments of the present disclosure. An operator of the system, such as a utility company, can indicate that one or more of their endpoint devices are to have their configuration data modified. This indication is acknowledged by the command center, which sends a configuration request to one or more collectors associated with corresponding endpoint devices. The command center can determine whether or not a group identification (ID) can be used to communicate with the endpoints. The command center can also determine whether or not individual configuration requests are required. For instance, the endpoints can store a unique ID (relative to other endpoints) and one or more group IDs. Consistent with embodiments of the present disclosure, more than one configuration request and associated group ID can be sent. In addition, configuration requests can be sent to individual endpoints.

The configuration requests can include a virtual ID for storage by the endpoints. The endpoints will then watch for broadcast communications to the virtual ID. As discussed herein, the communication plan can also include commands that remove endpoints from a virtual ID group. For instance, an endpoint may receive a configuration request directed toward a group ID for the endpoint. The endpoint would then store the virtual ID and be prepared to receive configuration commands addressed to the virtual ID. A subsequent command could be sent to the unique ID for the endpoint. This subsequent command could indicate that the endpoint should no longer respond to the virtual ID.

Consistent with a particular embodiment of the present disclosure, the endpoints can be configured to store numerous different group IDs. These group IDs can be generated by the command center and programmed in the endpoints during a (re)configuration process.

In certain embodiments, the configuration request can include an indication as to what types of configuration commands the endpoints should be prepared to receive in the future. For instance, the configuration request can specify by way of providing cyclic redundancy checks (CRC), or other error-detecting code, for the configuration data to be sent. The endpoint can then check received configuration data against the CRCs corresponding to the configuration commands. The CRC list can be all or a subset of the full CRC list of configuration data types stored by the endpoint. In certain embodiments, the configuration command can indicate which of the CRC lists are not being updated using a set value or bit mask (e.g., 0) as part of the configuration request command.

The configuration commands can then be sent from the command center to one or more of the collectors. In certain embodiments, the virtual ID assigned during configuration request can be used to broadcast the configuration commands to the endpoints. The broadcast can be particularly useful for conserving communication bandwidth over the power distribution lines.

The data in the configuration commands corresponds to changes to be made to existing configuration data in the endpoints. The endpoints, however, can delay updating the current configuration data until a desired time. This delay in execution of the configuration commands can be tied to a predetermined time or set according to a time provided in the configuration request.

Consistent with embodiments of the present disclosure, the endpoints can be configured to verify the received configuration data by checking the data against the CRC data received during the configuration request. This check can cause an update alarm to be sent from the endpoints. In response, the command center can determine what, if any, additional commands to send to the endpoints. For instance, the command center can send additional configuration commands or even rebroadcast configuration commands. The endpoints can also be configured to provide an indication that the configuration has been completed.

Aspects of the present disclosure recognize that the transmission of CRCs before the corresponding data can be useful for reducing bandwidth requirements. For instance, the endpoint can be responsible for determining (using the CRCs), when all the commands have been received, and then to switch over automatically at the specified time to the new configuration profile. Accordingly, additional data and status checks otherwise used to provide this determination can be avoided.

Figure 3:
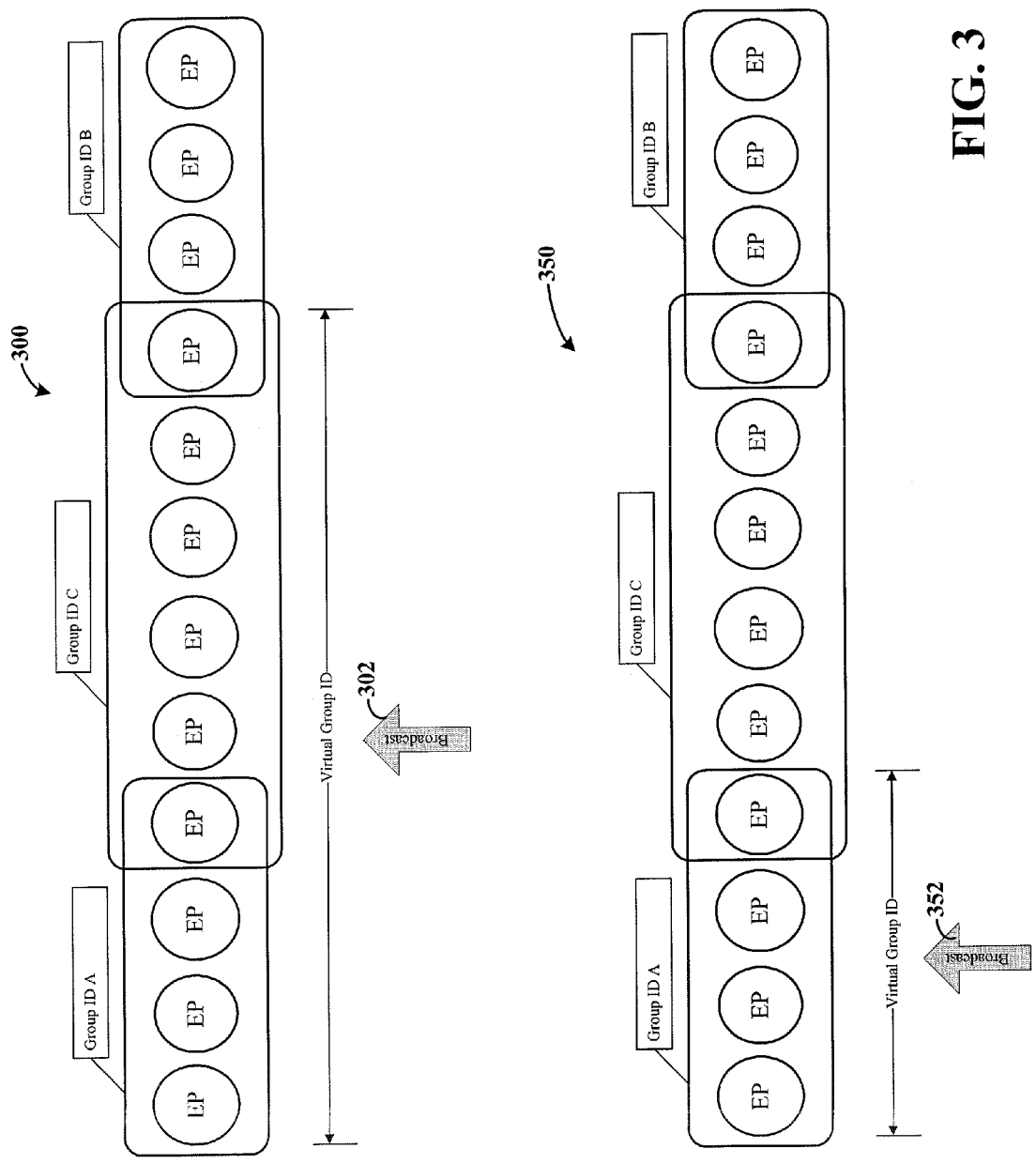
FIG. 3 depicts a breakdown of group IDs and broadcast messages that can be sent as part of configuring endpoints devices, consistent with embodiments of the present disclosure.

FIG. 3 depicts a breakdown of group IDs and broadcast messages that can be sent as part of configuring endpoints devices, consistent with embodiments of the present disclosure. Grouping 300 shows a possible breakdown of group IDs A-C. As shown, endpoints can be part of multiple group IDs. For instance, some, but not all, of the endpoints in group ID A are also part of group ID C and some, but not all, of the endpoints in group ID B are also part of group ID C. This can happen, for instance, where group ID C represents grouping according to a common TOU map, while group ID A and/or B represents grouping for a common short packing list.

Broadcast message 302 is shown as being sent to a subset of all the endpoints. This subset is addressed using a common virtual group ID that can be assigned using configuration request(s). In one embodiment, a configuration request with the virtual group ID can be sent to group ID A and another configuration request can be sent to group ID C. Thus, each of the targeted endpoints would receive the virtual group ID and be prepared to receive broadcasts sent thereto.

Grouping 350 shows the breakdown of group IDs A-C, relative to a different set of targeted endpoint devices. In this instance, the endpoint devices targeted by broadcast 352 include all of the endpoints in group ID A and only some of those in group ID C. Consistent with a particular embodiment of the present disclosure, the virtual group ID can be assigned by sending a broadcast configuration request to group ID A. The endpoints that are in group C can be configured using different possible communication plans. In a first possible communication plan, individual configuration requests can be sent to each of these endpoints using their unique IDs. In a second possible communication plan, a configuration request can be broadcast to endpoints in the group ID C. Individual messages can then be sent to untargeted endpoints in group ID C, the individual messages indicating that the virtual ID should not be used by the endpoint.

The present disclosure is not limited to the specific examples of FIG. 3. For instance, there can be many more different group IDs, and the number of different permutations for configuration requests can rapidly increase with the number of different group IDs.

Figure 4:
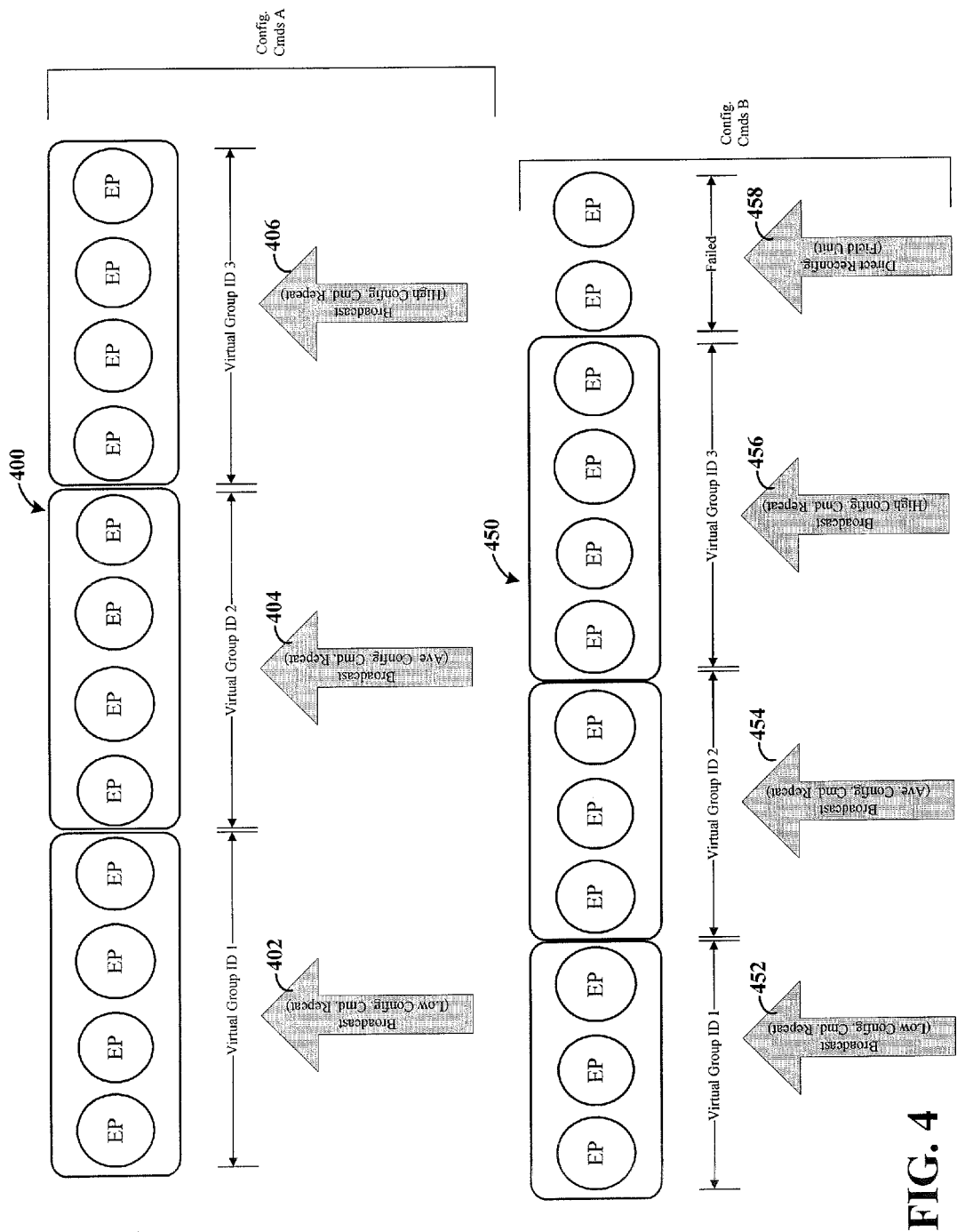
FIG. 4 depicts a communication plan that uses multiple virtual IDs, consistent with embodiments of the present disclosure.

FIG. 4 depicts a communication plan that uses multiple virtual IDs, consistent with embodiments of the present disclosure. Grouping 400 depicts three virtual group IDs (1-3). The use of multiple virtual group IDs can be useful for several reasons. For instance, the virtual group IDs could be used to send different configuration data to each of the groups. In another instance, the same configuration data can be sent, but the endpoints can be grouped for other reasons. One possible reason relates to the unpredictable nature of communicating over power distribution lines. This unpredictability can mean that certain endpoints are more likely to have data corrupted or otherwise be unable to receive communications. One way of quantifying this possibility is to monitor the noise on the power distribution lines. Other ways are also possible including, but not limited to, recording error rates for the endpoints and/or collectors. The communication plan can group endpoints according to the quantified representation of their communication path. Thus, 402 can represent virtual group ID 1, having a relatively low expected communication failure rate; 404 a medium or average expected failure rate and 406 a high expected failure rate. This allows for a communication plan that can be tiered accordingly. For instance, the virtual group ID 1 can use a relatively low repeat rate for the configuration commands A, whereas virtual group IDs 2 and 3 can use higher repeat rates, respectively. This allows less bandwidth to be used for some of the endpoints as well as allowing some of the endpoints to advance through the configuration process at a faster rate.

Embodiments of the present disclosure are directed toward the use of such a tiered communication plan to lessen the impact of problematic endpoint devices. For instance, the tiered communication plan allows the configuration process to advance for less than all of the endpoints. This advancement can also occur while simultaneously providing a communication plan that allows other endpoints to advance at a slower rate and/or allocates more bandwidth for other endpoints.

Grouping 450 represents a modification to the communication plan as it advances through the configuration process. The endpoints corresponding to virtual grouping IDs 1-3 can be changed according to their responsiveness. For instance, certain endpoints in virtual grouping 1 can exhibit problems with receipt of the configuration commands. This can occur where the problematic endpoints do not confirm receipt of the configuration commands before a threshold time or before a threshold number of repeated broadcasts of the configuration commands. The communication plan can reassign those problematic endpoints to the other virtual ID groups. This can be particularly useful for allowing the problematic endpoints to continue to receive configuration commands while also allowing the remaining endpoints to proceed through the configuration process. Accordingly, broadcasts 452, 454 and 456 are sent per the broadcast discussion for grouping 400, however, the endpoints that respond can be different.

Consistent with embodiments of the present disclosure, the communication plan can include a determination that certain endpoints have failed to update through commands received over the power distribution lines. A system operator can then determine how to deal with these endpoints. In one instance, the endpoints can be directly (re)configured 458 by servicing the endpoint on site (e.g., connecting to a local port of the endpoint using local connection port and a handheld field unit with the configuration commands).

When a handheld field unit is used in the field to manually reconfigure an endpoint, the handheld field unit can send synchronization information back to the command center when the user connects the handheld to a network linked to the command center, such as the Internet. In some instances, a user might not synchronize the handheld field unit before the predetermined reconfiguration time for the endpoint (e.g., at midnight). The command center might then receive an unexpected confirmation packet from the endpoint. The command center can be configured to assume that the endpoint was manually reconfigured. The command center can attempt to match the received CRC in the confirmation packet with CRCs from various configuration groups. In the event that no match is found, the command center can provide an indication of a possible error. A user can then investigate, and the command center can refuse to accept reading data from that endpoint until the situation is resolved.

Certain embodiments modify the communication plan by changing from group-addressed commands, to individual endpoint-addressed commands, in response to the number of remaining endpoints dropping below a (configurable) threshold.

Figure 5:
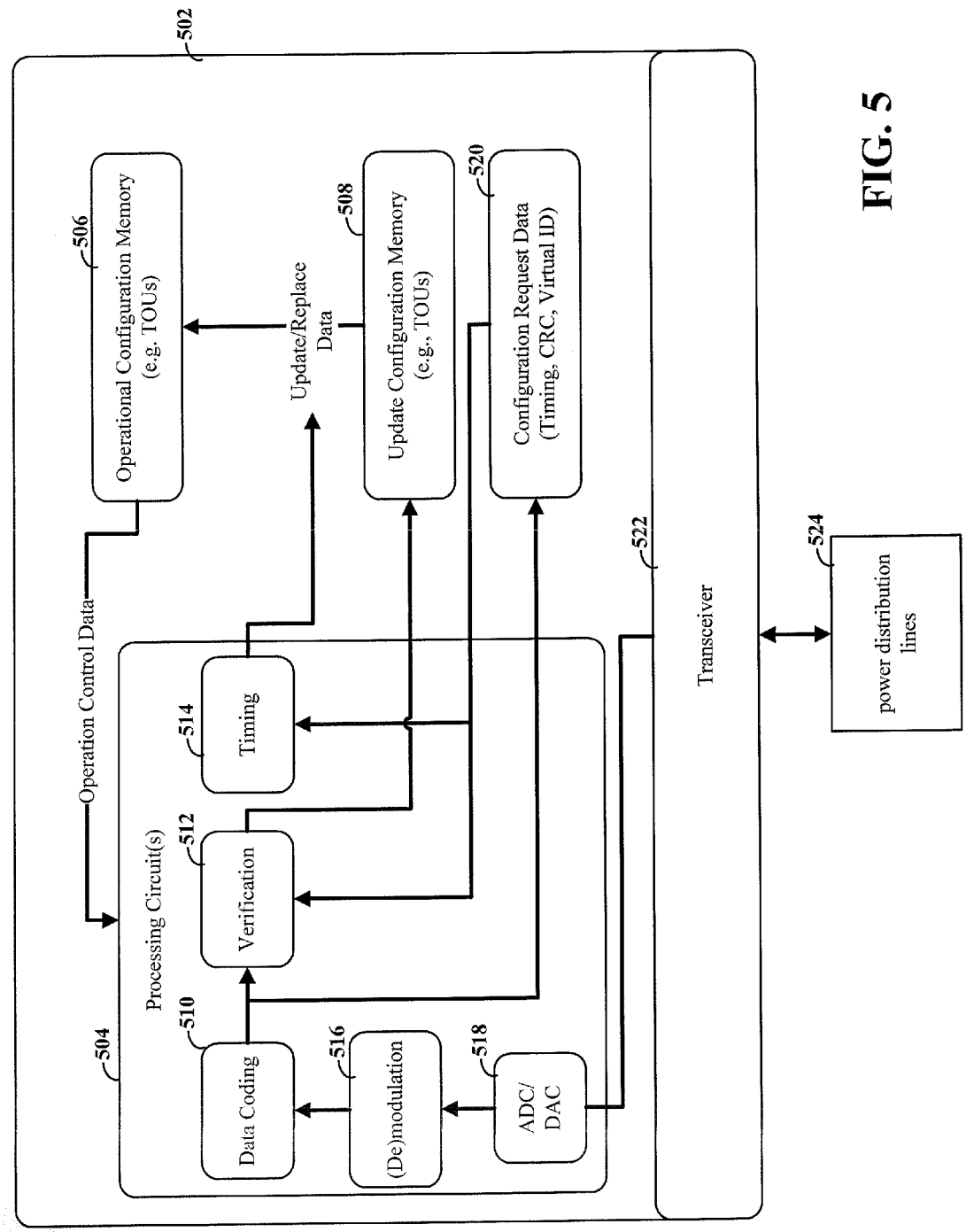
FIG. 5 shows a block diagram for an endpoint device, consistent with embodiments of the present disclosure.

FIG. 5 shows a block diagram for an endpoint device, consistent with embodiments of the present disclosure. An endpoint device 502 is coupled to power distribution lines 524 by way of a transceiver circuit 522. Transceiver circuit 522 can be configured to provide bi-directional communications over the power distribution lines 524. The endpoint device 502 includes one or more processing circuits 504. These processing circuits can perform the various functions including analog-to-digital conversion (ADC) and digital-to-analog conversion (DAC) 518, (de)modulation 516 and data coding 510.

During normal operation, endpoint 502 uses data stored in operational configuration memory 506. Endpoint 502 can be configured to store new configuration data in update configuration memory 508. Processing circuit 504 can be configured to operate according to operational configuration memory 506 irrespective of the data stored in update configuration memory 508. This can be particularly useful for allowing the endpoints to be configured at a specified time or in response to a specific request.

Consistent with embodiments of the present disclosure, endpoint 502 can be configured and arranged to store configuration request data 520. This data 520 can include timing information, CRC data and/or a virtual ID. The processing circuit 512 can access the data 520 to verify 512 the configuration data stored in update configuration memory 508 against the CRC data and to determine 514 when the operational configuration memory 506 should be replaced/updated with the data stored in update configuration memory 508.

Figure 6:
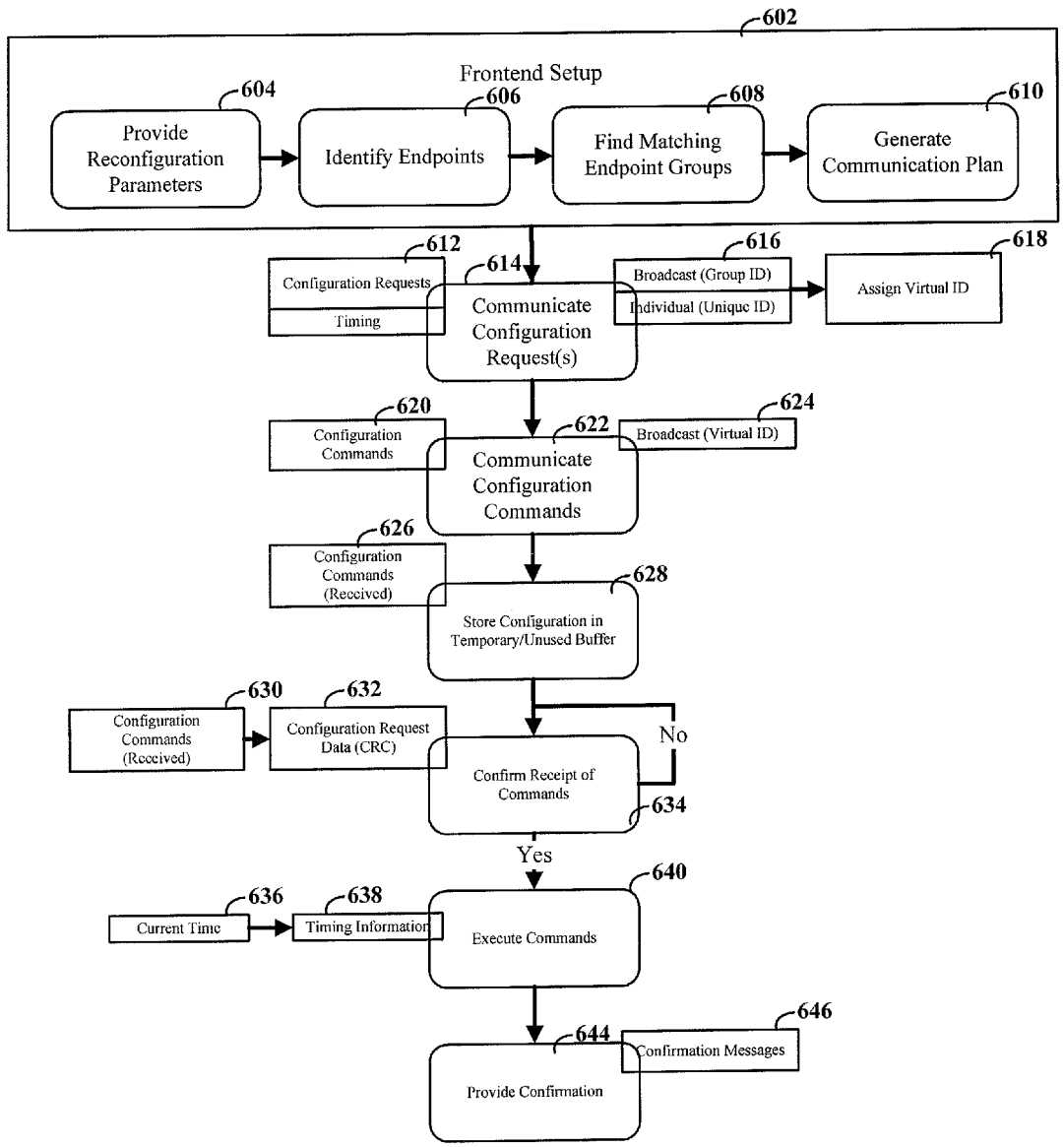
FIG. 6 depicts a flow diagram for configuring endpoints, consistent with embodiments of the present disclosure.

FIG. 6 depicts a flow diagram for configuring endpoints, consistent with embodiments of the present disclosure. Frontend setup 602 allows a system operator to determine the scope of the current configuration process. This frontend setup 602 can include defining or providing the (re)configuration parameters 604. The configuration parameters can include a list of configuration types corresponding values for updating. For instance, the configuration parameters can specify that a TOU map will be changed to a new TOU map and that the packet definition (packing lists) will be changed to a new setting. During the frontend setup 602 it is also necessary to identify endpoints 606 that are targeted for receipt of the new configuration data. In certain embodiments of the present disclosure, the identified/targeted endpoints can then be matched to corresponding endpoints group IDs 608. This information can then be used to generate a communication plan 610. As discussed herein, additional information can also be used in generating the communication plan 610.

At block 614, configuration requests 612 are communicated to the endpoint devices according to the communication plan 610. The configuration requests 612 can originate at a command center and be communicated to the endpoints by collectors and over power distribution lines. The (re)configuration commands 612 can include various information including timing data, CRC data and virtual ID(s). The collectors can then broadcast 616 the configuration commands using group IDs, individual endpoint IDs or both. Endpoints can then be assigned a virtual ID 618, and can also be configured with CRC and timing data. At block 622, configuration commands 620 are communicated using broadcast messages 624 addressed to one or more virtual IDs.

At block 628, the endpoints store data from the received configuration commands 626. This data can include data for one or more data fields in the current operational configuration memory. This data is stored in a secondary memory location/buffer so that endpoint device can continue to operate using the settings for the current/previous configuration memory.

At block 634, the endpoint device confirms receipt of the communication commands 630. The endpoint can first verify the communication commands 630 using CRC data received in the configuration request 632. Once the data has been verified, the endpoint can transmit a confirmation message.

At block 640, the endpoint determines that the configuration commands should be executed. This allows the operational configuration memory to be updated according the stored configuration command data. In certain embodiments of the present disclosure, the determination can be responsive to detecting that the current time 636 corresponds to a timing 638. Timing 638 can be provided as part of the configuration request or set as a predetermined time (e.g., midnight).

At block 644, the endpoint provides confirmation message 646 to indicate that the configuration commands were successfully executed. The confirmation of configuration can be sent as part of a response packet that the endpoint sends back to the command center, at a specified time and after a successful reconfigure operation has completed in the endpoint. Certain embodiments are directed toward a confirmation packet that includes the CRCs. These CRCs can include endpoint unique CRCs (e.g., a CRC table having table entries containing endpoint-specific configuration information). The command center can then verify that the endpoint was successful using the CRCs.

In certain embodiments a confirmation packet can take a long time to fully send to the command center. A command center that is expecting a confirmation packet to begin at a certain time of day can discard data from the endpoint until a confirmation packet is received. This can happen where the beginning of a packet is missed (the first packet chunk starting at the certain time of day). This can be particularly useful for avoiding ambiguities due to not knowing whether the endpoint correctly switched over. For instance, processing data from an endpoint having a different configuration group than expected could cause the wrong billing data to get submitted to a utility company's billing system.

In certain embodiments, the endpoints can be configured to maintain two sets of configuration buffers. When configuring the endpoint, downstream commands will update the "new" buffer, while the endpoint continues to follow the "current" buffer. Aspects of the present disclosure are directed toward configuring the new buffer based upon CRC data received in the configuration request. When the "new" buffer has been configured and verified, the endpoint can send an alarm event indicating as much.

Embodiments of the present disclosure are directed toward alternative mechanisms for configuring the new buffer. In one such embodiment, the configuration information is broken into blocks of memory (e.g., 64, 128 or 256 bytes). A CRC is provided for each block, but the endpoint does not need knowledge of the particular data fields represented by each block.

Consistent with embodiments of the present disclosure, the timing for the execution of the configuration commands can be set according to a specific day of the week, month and/or year. To reduce bandwidth, particular embodiments allow for the use of a day bitmask that allows a single command to set the day of the week for the execution of the configuration commands.

Embodiments of the present disclosure allow for any number of different configuration settings. A few non-limiting examples include metrology time data, packet definition and sequence data, TOU Maps, demand reset schedule, command addressing groups (group IDs), daylight savings time schedule, service disconnect parameters, service limiting parameters, and simple load control parameters.

Embodiments of the present disclosure are directed toward the use of a bitmask that indicates which commands are to be sent to the endpoint. The bitmask can specify, and the endpoint can track, the number of unique commands it receives.

This bitmask method can be particularly useful for reducing the bandwidth required, e.g., relative to using CRCs.

Embodiments of the present disclosure are directed toward the communication plan being altered to optimize which set of downstream commands are sent based on feedback from the endpoints. The feedback can include indications as to where they are in the configuration process.

Still other embodiments of the present disclosure account for different versions of endpoints (e.g., different firmware versions). For instance, endpoints with different firmware versions might calculate CRCs differently. One mechanism is to maintain CRC calculation across different firmware versions. Another mechanism involves the use of modular piece of code that is independent of the version. The CRC calculation module can be maintained/updated to account for both new and old versions.

Consistent with embodiments of the present disclosure, an endpoint device can be directly assigned to new configuration groups by a service technician. The assignment can occur at arbitrary times (e.g., the middle of the day). The service technician can provide the update using handheld device that synchronizes with the command center to indicate which endpoints were updated. It is possible that the handheld device fails to provide the synchronization information before midnight that same day. Thus, the endpoint might have configured itself and the command center would not be aware of this change. The endpoint can therefore be configured to send an alarm event to report when it was connected to locally (e.g., optically). The endpoint can also send another alarm event to report when the configuration data was received and verified. Yet another communication can be sent when the endpoint executes the confirmation commands (e.g., at midnight).

Other embodiments relate to the use of a cancel configuration command. This cancel configuration command can be used to prevent an endpoint from executing received configuration commands. For instance, a system operator might incorrectly identify one or more endpoints as being targeted for configuration. If the system operator detects the error before the endpoints have executed the configuration commands, the system can send a cancel configuration command to the improperly targeted endpoints. The collectors can be configured to respond to a cancel configuration command by determining whether configuration commands have already been sent to the endpoints. If the commands were not sent, the collector can cancel the commands (e.g., by clearing them from its downstream queue). If commands were sent to endpoints from the collector, a cancel command can be forwarded to the endpoints. The endpoints then take appropriate action (e.g., exit from configuration mode). In certain embodiments, the endpoints can send a confirmation that the cancellation was received and executed.

In certain situations, all downstream commands may have already been sent at least once, with the collector possibly still repeatedly resending the commands. The appropriate action for an endpoint receiving a cancel configuration command would then be to cancel the scheduled switch.

Other embodiments of the present disclosure related to an undo configuration command. This undo configuration command can be used to indicate that an endpoint should revert to its previous configuration settings. The reversion can be accomplished by having the endpoint store the previous configuration settings in an old buffer and by replacing the current configuration settings at a specified time (e.g., at midnight).

Particular embodiments of the present disclosure recognized that a single configuration command can be used for small changes. For instance, a single command could be used to add or remove an endpoint to/from one or more command addressing groups. In certain embodiments, a single atomic command can be used to change data specific to a particular endpoint.

Certain embodiments of the present disclosure allow a different group/virtual ID value to be assigned to different CRCs. This allows for CRC blocks to be separately configured. For example, endpoints with different group IDs may contain the same TOU MAP 'X.' Rather than sending separate broadcasts to the different group IDs, a group ID could be associated with TOU MAP 'X.' Thus, each configuration (CRC) field could contain a respective group ID that is stored by all endpoints configured to the particular CRC. The endpoints would then check the group IDs for each of the CRCs against any broadcast message.

Various embodiments are directed toward a first set of CRC blocks that are associated with data designed for use (or likely to be used) for sending commands using broadcast commands. A second set of CRC blocks that are associated with data designed for use (or likely to be used) for sending commands using commands addressed to individual endpoints. In this manner, the use of broadcast messages can be facilitated to improve the bandwidth requirements.

The signals and associated logic and functionality described in connection with the figures can be implemented in a number of different manners. Unless otherwise indicated, various general purpose systems and/or logic circuitry may be used with programs in accordance with the teachings herein, or it may prove convenient to construct a more specialized apparatus to perform the required method. For example, according to the present disclosure, one or more of the methods can be implemented in hard-wired circuitry by programming a general-purpose processor, other fully or semi-programmable logic circuitry, and/or by a combination of such hardware and a general-purpose processor configured with software. Accordingly, the various components and processes shown in the figures can be implemented in a variety of circuit-based forms, such as through the use of data processing circuit modules.

It is recognized that aspects of the disclosure can be practiced with computer/processor-based system configurations other than those expressly described herein. The required structure for a variety of these systems and circuits would be apparent from the intended application and the above description.

The various terms and techniques are used by those knowledgeable in the art to describe aspects relating to one or more of communications, protocols, applications, implementations and mechanisms. One such technique is the description of an implementation of a technique expressed in terms of an algorithm or mathematical expression. While such techniques may be implemented, for example, by executing code on a computer, the expression of that technique may be conveyed and communicated as a formula, algorithm, or mathematical expression.

For example, block denoting "C=A+B" as an additive function whose implementation in hardware and/or software would take two inputs (A and B) and produce a summation output (C), such as in combinatorial logic circuitry. Thus, the use of formula, algorithm, or mathematical expression as descriptions is to be understood as having a physical embodiment in at least hardware (such as a processor in which the techniques of the present disclosure may be practiced as well as implemented as an embodiment).

In certain embodiments, machine-executable instructions are stored for execution in a manner consistent with one or more of the methods of the present disclosure. The instructions can be used to cause a general-purpose or special-purpose processor that is programmed with the instructions to perform the steps of the methods. The steps may be performed by specific hardware components that contain hardwired logic for performing the steps, or by any combination of programmed computer components and custom hardware components.

In some embodiments, aspects of the present disclosure may be provided as a computer program product, which may include a machine or computer-readable medium having stored thereon instructions which may be used to program a computer (or other electronic devices) to perform a process according to the present disclosure. Accordingly, the computer-readable medium includes any type of media/machine-readable medium suitable for storing electronic instructions.

The various embodiments described above are provided by way of illustration and should not be construed to necessarily limit the disclosure. Based on the above discussion and illustrations, those skilled in the art will readily recognize that various modifications and changes may be made to the present disclosure without strictly following the exemplary embodiments and applications illustrated and described herein. For instance, such changes may include variations on mechanisms for synchronization with (and/or tracking of) the AC line frequency. Such modifications and changes do not depart from the true spirit and scope of the present disclosure, including aspects set forth in the following claims.

What is claimed is:

1. A method for providing configuration data while conserving bandwidth of communications over power distribution lines carrying alternating current (AC) power, where bandwidth is shared between a plurality of endpoint devices that are configured to provide utility usage data over the power distribution lines, the method comprising:
    identifying a group of endpoint devices, from the plurality of endpoint devices, that are targeted for changes to stored configuration data;
    developing a communication plan by selecting between group identifications (IDs) for subsets of the plurality of endpoint devices, the selection responsive to correspondence to one or more endpoints in the group of endpoint devices and based upon the available bandwidth on the power distribution lines;
    communicating, over the power distribution lines, a configuration request according to the communication plan and by broadcasting the request to the selected group ID(s);
    communicating, over power distribution lines, configuration commands to the group of endpoint devices using broadcast messages that reduce the data bandwidth over power distribution lines, and wherein the step of communicating a configuration request includes associating an assignment of the group of endpoint devices to a virtual ID and wherein the step of communicating configuration commands includes configuring the broadcast messages to use the virtual ID common to the group of endpoint devices;
    communicating, over power distribution lines, utility usage data interspersed with confirmation data indicating that the configuration commands were received by the group of endpoint devices; and
    adjusting the communication plan in response to the confirmation.

2. The method of claim 1, wherein the step of developing a communication plan includes selecting a transmission rate for the broadcast messages as a function of the shared bandwidth.

3. The method of claim 1, wherein the configuration request indicates what types of configuration commands will be sent and wherein the step of communicating confirmation data is responsive to a comparison between the indicated types of configuration commands and those configuration commands actually received.

4. The method of claim 1, further including a step of communicating, over power distribution lines, cancel configuration commands to at least one endpoint of the group of endpoint devices.

5. The method of claim 1, wherein the step of communicating a configuration request includes assigning a first subset of the group of endpoint devices to a first virtual ID; and the step of communicating configuration commands includes configuring the broadcast messages to use the first virtual ID, and further including the steps of assigning a second subset of the group of endpoint devices to a second virtual ID and configuring a second broadcast message to use the second virtual ID.

6. The method of claim 5, wherein the first and second subsets of the group of endpoint devices are assigned based upon corresponding and different configuration data of the endpoint devices.

7. A method for providing configuration data while conserving bandwidth of communications over power distribution lines carrying alternating current (AC) power, where bandwidth is shared between a plurality of endpoint devices that are configured to provide utility usage data over the power distribution lines, the method comprising:
    identifying a group of endpoint devices, from the plurality of endpoint devices, that are targeted for changes to stored configuration data;
    developing a communication plan by selecting between group identifications (IDs) for subsets of the plurality of endpoint devices, the selection responsive to correspondence to one or more endpoints in the group of endpoint devices and based upon the available bandwidth on the power distribution lines;
    communicating, over the power distribution lines, a configuration request according to the communication plan and by broadcasting the request to the selected group ID(s);
    communicating, over power distribution lines, configuration commands to the group of endpoint devices using broadcast messages that reduce the data bandwidth over power distribution lines;
    communicating, over power distribution lines, utility usage data interspersed with confirmation data indicating that the configuration commands were received by the group of endpoint devices;
    adjusting the communication plan in response to the confirmation; and
    wherein the step of developing a communication plan includes developing a tiered grouping of the group of endpoint devices according to stored communication metrics representing data transmission fidelity of the group of endpoint devices.

8. A method for providing configuration data while conserving bandwidth of communications over power distribution lines carrying alternating current (AC) power, where bandwidth is shared between a plurality of endpoint devices that are configured to provide utility usage data over the power distribution lines, the method comprising:

identifying a group of endpoint devices, from the plurality of endpoint devices, that are targeted for changes to stored configuration data;

developing a communication plan by selecting between group identifications (IDs) for subsets of the plurality of endpoint devices, the selection responsive to correspondence to one or more endpoints in the group of endpoint devices and based upon the available bandwidth on the power distribution lines;

communicating, over the power distribution lines, a configuration request according to the communication plan and by broadcasting the request to the selected group ID(s);

communicating, over power distribution lines, configuration commands to the group of endpoint devices using broadcast messages that reduce the data bandwidth over power distribution lines;

communicating, over power distribution lines, utility usage data interspersed with confirmation data indicating that the configuration commands were received by the group of endpoint devices;

adjusting the communication plan in response to the confirmation; and wherein the step of adjusting the communication plan in response to the confirmation includes grouping endpoints based upon their progress toward receiving the configuration commands.

9. A method for conserving bandwidth for communications over power distribution lines carrying alternating current (AC) power, the method comprising:

identifying a subset of a plurality of endpoint devices as targets for updates to utility meter reporting configuration data;

communicating a configuration request over the power distribution lines using endpoint identifiers corresponding to the subset of endpoint devices, the configuration request including an indication for what configuration commands will be forthcoming and an assignment of a virtual identifier to the subset of endpoint devices;

communicating a broadcast message over the power distribution lines, the broadcast message addressed to the subset of endpoint devices using the virtual identifier and including at least some of the forthcoming configuration commands;

communicating, for each endpoint device of the subset of endpoint devices, confirmation of the receipt of all of the forthcoming configuration commands; and executing, for each endpoint device of the subset of endpoint devices, the configuration commands.

10. The method of claim 9, wherein the step of communicating a configuration request includes sending a configuration time and wherein the step of executing occurs, for each endpoint device of the subset of endpoint devices, at the configuration time.

11. The method of claim 9, wherein the step of communicating a configuration request includes sending a plurality of messages, each message containing an endpoint identifier that uniquely identifies one endpoint device relative to the plurality of endpoint devices.

12. The method of claim 9, wherein the step of communicating a configuration request includes sending a single broadcast message, containing a group identifier that identifies the plurality of endpoint devices.

13. A circuit-based apparatus comprising:
a transceiver circuit configured and arranged to communicate over power distribution lines that carry power using alternating current (AC); and
a processing circuit configured and arranged to
operate according to configuration data stored in a first memory buffer;
receive an input digital signal representing an analog signal received at the transceiver circuit;
decode the input digital signal;
identify a configuration request from the decoded input digital signal;
store data from the configuration request in a second memory buffer;
verify the data from the configuration request;
maintain, after verifying the data, operation according the configuration data stored in the first memory buffer;
replace, in response to a timer event, the configuration data stored in the first memory buffer with the data from the configuration request in the second memory buffer; and
operate according to the data from the configuration request in the first memory buffer.

14. The circuit-based apparatus of claim 13, wherein the processing circuit is configured and arranged to compare identification information in the configuration request with a locally-stored identifier and to prevent the storing of the data from the configuration request in the second memory buffer in response to a failed comparison.

15. The circuit-based apparatus of claim 14, wherein the processing circuit is configured and arranged to detect the absence of a group identifier in the configuration request before preventing the storing of the data.

16. The circuit-based apparatus of claim 13, wherein the timer event is the occurrence of a specified time-of-day.

17. The circuit-based apparatus of claim 13, wherein the processing circuit is configured and arranged to send a configuration confirmation using the transceiver circuit.

18. A method comprising:
receiving, using a transceiver circuit, an analog data communication over power distribution lines that carry power using alternating current (AC); and
using a processing circuit to
operate according to configuration data stored in a first memory buffer;
convert the analog data communication to a digital signal;
decode the digital signal;
identify a configuration request from the decoded digital signal;
store data from the configuration request in a second memory buffer;
verify the data from the configuration request;
maintain, after verifying the data, operation of the processing circuit according to the configuration data stored in the first memory buffer;
replace, in response to a timer event, the configuration data stored in the first memory buffer with the data from the configuration request in the second memory buffer; and
operate the processing circuit according to the data from the configuration request in the first memory buffer.

* * * * *

UNITED STATES PATENT AND TRADEMARK OFFICE
CERTIFICATE OF CORRECTION

PATENT NO. : 9,019,121 B1
APPLICATION NO. : 13/335470
DATED : April 28, 2015
INVENTOR(S) : Duff et al.

Page 1 of 1

It is certified that error appears in the above-identified patent and that said Letters Patent is hereby corrected as shown below:

In the Claims

Col. 22, lines 16-17, Claim 13: "according the" should read --according to the--.

Signed and Sealed this
Twenty-third Day of August, 2016

Michelle K. Lee
*Director of the United States Patent and Trademark Office*